United States Patent [19]

Sample, Jr. et al.

[11] 3,922,403

[45] Nov. 25, 1975

[54] SCALE CONTROL

[75] Inventors: Thomas E. Sample, Jr.; Jack F. Tate, both of Houston, Tex.

[73] Assignee: Texaco Inc., New York, N.Y.

[22] Filed: May 30, 1972

[21] Appl. No.: 257,726

Related U.S. Application Data

[62] Division of Ser. No. 142,014, May 10, 1971, abandoned.

[52] U.S. Cl. .............................................. 427/340
[51] Int. Cl. ........................ B44d 1/44; B32b 15/08
[58] Field of Search ............ 117/62.1, 62.2, 132 BF, 117/123 D, 124 E, 138.8 A; 260/59, 838

[56] References Cited
UNITED STATES PATENTS

| | | | |
|---|---|---|---|
| 2,499,368 | 3/1950 | DeGroote et al. ................ | 260/58 X |
| 2,894,931 | 7/1959 | Somerville et al. ............ | 117/132 BF |
| 3,047,426 | 7/1962 | Murdock et al. ............ | 117/139.5 X |
| 3,288,745 | 11/1966 | Hempel et al. ................ | 117/132 BF |
| 3,488,289 | 1/1970 | Tate ............................... | 252/8.55 X |

*Primary Examiner*—Harry J. Gwinnell
*Attorney, Agent, or Firm*—T. H. Whaley; C. G. Ries; Kenneth R. Priem

[57] ABSTRACT

A process for producing a fully cured, infusible coating which when applied to surfaces normally susceptible to the deposition of mineral scale substantially improves the resistance of such surfaces to mineral scale comprising, (1) applying to a substrate whose scale resistance is to be improved an acid or base catalyzed phenolic-aldehyde resin condensate containing a substantial number of reactive hydroxyl groups which are susceptible to oxyalkylation by a base catalyzed reaction with alkylene carbonate; and (2) contacting the resin condensate coated on the substrate with a catalytic quantity of basic catalyst and at least two moles of molten alkylene carbonate per mole of phenolic hydroxyl groups at a temperature ranging from about 350° to 380°F. until the surface of the coated substrate is converted into a surface with substantially improved scale-resistant properties; then (3) curing the resin until it is a fully cured, infusible coating bonded to the noramlly scale-susceptible surface.

11 Claims, 1 Drawing Figure

SCALE CONTROL

CROSS REFERENCE TO RELATED APPLICATIONS

This is a divisional of application Ser. No. 142,014 filed May 10, 1971, now abandoned.

This invention concerns methods of inhibiting and/or controlling mineral-scale formation upon surfaces which are normally susceptible to scale formation during contact with mineralized waters.

More particularly, this invention concerns the application of partially cured phenolic-aldehyde type resin coatings to surfaces normally prone to scaling then fully curing said coatings to produce surfaces substantially resistant to adherent scale formation.

Mineralized or "hard" waters as defined throughout this application are waters containing in solution alkaline earth and/or iron compounds which upon alteration of environmental conditions are prone to deposit mineral scale therefrom on surfaces contacting them.

BACKGROUND OF INVENTION

Inorganic mineral scale concretion or the deposition of scale coatings derived from the extended contact of surfaces normally susceptible to scale formation with hard waters, particularly waters containing alkaline earth and/or iron compounds, is both wasteful and commonplace. While scale formation upon metal surfaces presents the more serious problem, non-metallic surfaces including ceramics, glasses and organic polymers may also undergo scaling.

Particularly troublesome are the tenacious "furs" or "crusts" that form in operational processing equipment in continuous and/or prolonged contact with aqueous solutions of alkaline earth sulfates, carbonates and bicarbonates. This type of scale formation creates serious problems for the petroleum and gas-producing industries, where the build-up of undesirable inorganic mineral scale deposits can take place in equipment or tubing of difficult or limited accessibility. These include flow lines in both surface and subterranean locations, including auxiliary producing equipment, such as heaters, pumps, valves, rods, and the like. In addition, scale formation can also cause substantial problems in the chemical processing industries, public utilities, and in other situations where mineral-laden water is processed or used, as in the generation of steam, or where there is a wide-scale use of boilers, heat exchangers, storage vessels, piping, reactors, evaporators, and the like.

Several different explanations have been advanced as to how the formation of mineral scale deposits, such as for example calcium or barium sulfate, takes place. One mechanism leading to scale formation comes about from the mingling of a fluid stream containing a substantial concentration of an anion or cation with another stream containing antagonistic counter ions. An illustration of this mechanism would be a case in which one process stream containing a soluble calcium compound contacts another stream containing a soluble sulfate compound to cause precipitation of calcium sulfate. Should the mixing of such incompatible waters take place in a well bore, the result may be deposition of a crust of calcium sulfate which, if allowed, can build up on the surface of submerged equipment such as tubing, and may even choke off fluid flow by diminution of utilizable diameter unless corrective descaling measures are undertaken. In the case of heat exchange equipment, the mineral scale deposition insulates the equipment from the source or sink of heat and increases the cost of operation and may cause extensive maintenance or down-time and increased operational costs.

Another cause of mineral scale formation arises from aqueous solutions of inorganic materials having an inverse solubility curve, that is, a solubility which decreases as the temperature increases. An excellent example of this is calcium sulfate, whose solubility in water decreases with increased temperature. This can present particularly severe problems in boilers. In these instances the solution immediately adjacent to the heating surface reaches saturation the most quickly, dropping calcium sulfate at this junction which is held tenaciously to the heating surface.

Yet another cause of scale formation is attributable to precipitation of scale material from supersaturated solutions, of which the preceding example is a special case. When temperature and/or pressure changes occur, or the concentration of some solubilizing substances is substantially decreased, this change of conditions can result in scale formation on the tubing or other equipment being operated.

Whatever the reason or reasons for the scale formation may be, as outlined above, it is a troublesome and expensive process that can lead to costly, unscheduled maintenance and even to the breakdown of operation units. For these reasons, a number of remedial measures have been resorted to, both for the removal of scale or mitigation of its formation.

Scale is ordinarily removed by either chemical or mechanical methods, or a combination of both methods. In chemical descaling procedures, the problem is to find a material that will dissolve or loosen the mineral scale without attacking the underlying substrate.

Inhibited hydrochloric acid has proved useful in instances where the scale is acid soluble. Unfortunately, many mineral scales, such as calcium sulfate, are not appreciably soluble in acids. Calcium sulfate scales can sometimes be dissolved or loosened by repeated and extended treatment with ammonium salts, polyphosphates, or hydroxides, often followed by acid washing. For example, it has been disclosed that if calcium sulfate scale is exposed to concentrated potassium hydroxide for periods ranging from about 24 to 72 hours, it will form a white, fluffy precipitate of calcium hydroxide which can be abraded off by mechanical means.

Mechanical abrasive methods utilizing various tools are commonplace in cleaning steam generators, but the procedures are tedious, time-consuming, and often inefficient. Further, for practical purposes, limitations on the minimal size of the descaling tools usually require openings having a diameter of ¼ inch or larger.

In view of the shortcomings of descaling operations, whether employing chemical and/or mechanical means, recent work has concentrated increasingly on preventive methods.

Various types of protective resin or "plastic" coatings are commonly applied to metal surfaces subject to service in contact with mineralized waters to prevent corrosive attack; however, experience has revealed that these coatings, while affording effective protection against corrosive attack on the metal, are not substantially less prone to scale build-up from the mineralized water than the uncoated metals themselves.

It should be noted that the instant invention is not only applicable to metallic surfaces which are subject to scaling in mineralized waters but is equally applicable to scale-prone non-metallic surfaces such as glass, ceramics, organic polymeric materials, etc.

In view of the fact that none of the various types of plastic or resin surface coatings widely used for corrosion protection are substantially less susceptible to scale build-up than are uncoated metal surfaces, it was unexpected to find that modification of the surfaces of partially cured phenolic-aldehyde resin condensates through introduction of oxyalkylene groups into said condensates, the surfaces of which are normally susceptible to scale build-up, are converted after curing into scale-resistant surfaces, when compared either to uncoated metal controls or to the metal controls coated with the same cured but unmodified resins.

Thus, it is a broad object of this invention to provide phenolic-type resin coatings, having surfaces resistant to scaling, and which when bonded to metallic or non-metallic substrates normally susceptible to the build-up of scale, greatly inhibit scale formation thereon as compared to the uncoated substrate.

A further and more specific object of this invention is to provide processes whereby the scale-susceptibility of scale-prone surfaces is substantially lowered by application thereto of partially cured phenolic-aldehyde type resins, which possess scale inhibitory properties subsequent to or both prior and subsequent to their application, followed by fully curing the said resins on the said surfaces.

Yet a further and even more specific object of this invention is to provide a process for modifying partially cured phenolic-aldehyde type resins subsequent to their application to scale-prone substrates so as to convert the normally scale-susceptible surfaces of said applied resins to scale-resistant surfaces.

Other objects of this invention will become apparent to those skilled in the art after perusal of this disclosure.

The above objects are achieved through the application of a scale-resistant coating of a modified phenolic-aldehyde type resinous material to a substrate surface which is normally susceptible to scaling when in contact with mineralized waters.

In the broadest practice of this invention, surfaces normally subject to scaling when in contact with mineralized waters are protected from scaling by the steps comprising:

a. applying a partially cured phenolic-aldehyde type resin possessing scale-resistant properties in amounts sufficient to coat the surfaces to be protected from scaling; then, b. heating said partially cured resin to cure and strongly bond said coating to the scale-prone surfaces to be protected.

In the most favored practice of this invention, surfaces normally subject to scaling when in contact with mineralized waters are made substantially more resistant to the deposition of adherent scale thereon by the steps comprising:

a. applying a sufficient amount of a partially cured, phenolic-aldehyde resin containing a plurality of reactive hydroxyl groups to the surface to be protected, without substantially destroying the susceptibility of the reactive hydroxyl groups to participate in an oxyalkylation reaction with a source of oxyalkylene groups; then, b. contacting said partially cured resin containing a plurality of free hydroxyl groups, in a catalytic environment, with a molar excess of said source of oxyalkylene groups for a time and at a temperature sufficient to convert the scale-susceptible surface to a surface substantially improved in scale resistance.

In the preferred practice of this invention, surfaces normally susceptible to the deposition of mineral scale thereon, including calcium sulfate scale, are converted into surfaces substantially more resistant to scaling by the steps comprising:

a. applying to the substrate surface whose resistance to scaling is to be improved, an acid or base catalyzed phenolic-aldehyde resin condensate containing a substantial number of reactive hydroxyl groups, said groups being susceptible to oxyalkylation by the base-catalyzed reaction with a source of oxyalkylene groups selected from the class consisting of alkylene carbonates, alkylene sulfites, alkylene oxides and mixtures thereof; and, b. contacting each mole of said resin condensate in the presence of at least a catalytic quantity of base, with about two or more moles of at least one source of oxyalkylating groups per mole of phenolic ring group in the resin, at a temperature ranging from about 300° to 400° F, until the surface of the resin which is normally susceptible to scaling is converted into a surface substantially more resistant to scaling; then, c. curing said resin now having improved scale-resistance until it becomes a fully cured, infusible coating bonded to the scale-prone substrate surface without substantial loss of its improved scale resistance.

To aid further in understanding the concepts of this invention, the following supplemental disclosure is submitted:

A. Scale-Resistant Surfaces

While the success of this invention is not predicated on any particular mechanism, nor on the assignment of any particular structure to the subject scale-resistant coatings, it is believed that the surfaces of said scale-resistant coatings present to an aqueous environment containing potentially scale-forming minerals, or ions, a multiplicity of chemically attached oxyalkylene groups, which groups attract and retain in close proximity to themselves through the influence of "hydrogen bonding" an envelope of water molecules; and, further, it is speculated that the "hydrated" surface so produced with its substantially immobilized boundary layer of water molecules performs as a barrier to the growth and/or attachment of scale nuclei or crystallites from the surrounding mineralized aqueous environment to the surface of the subject resin coatings. We emphasize that, whereas the foregoing structural and mechanistic description of the manner in which the surfaces of the resins of the instant invention function to inhibit deposition thereon of mineral scale is consistent with our currently limited factual understanding of the phenomenon, we pose the foregoing explanation as a reasonable working hypothesis only and intend it to act in no manner as, or be construed as, presenting either a limitation or condition to the teachings, practice, success or scope of the present invention or to its claims.

The aforementioned oxyalkylene groups present in the subject scale-resistant resinous coatings may be represented by the following structural formula:

$-O+CH_2-CHR-O+_n$ wherein R is preferably selected from the group consisting of hydrogen, methyl or ethyl, and mixtures thereof; and $n$, which represents the average number of groups in the oxyalkylene chain, ranges from about 2 to about 12, preferably from 3 to 8. The scale-resistant resinous coatings of this invention can be prepared by the treatment of phenolic-aldehyde type condensates, preferably phenol-formaldehyde condensates of either the Resole or Novalak type containing a plurality of aliphatic and/or aromatic hydroxyl groups, with some source of oxyalkylene radicals such as the lower alkylene oxides (e.g., ethylene oxide, propylene oxide, butylene oxides and mixtures thereof), as well as certain compounds such as ethylene carbonate, propylene carbonate, ethylene sulfite and the like, which are also capable of introducing oxyalkylene linkages into the coatings. A non-restrictive illustration of one method of preparing a typical novel scale-resistant resin as taught by this invention may be symbolically shown thus:

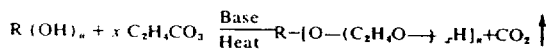

$$R(OH)_n + xC_2H_4CO_3 \xrightarrow[\text{Heat}]{\text{Base}} R-[O-(C_2H_4O\rightarrow_xH]_n+CO_2\uparrow$$

wherein $R(OH)_n$ represents a partially cured phenol-formaldehyde resin containing $n$ reactive hydroxyl groups, $n$ being a number of 1 to about 15; wherein $x$ represents the average degree of oxyalkylation (oxyethylation, in this illustration) of the resin, being at least about 1; and $C_2H_4CO_3$ is ethylene carbonate, the source of oxyethylene radicals chosen for this particular non-restrictive illustration. Clearly, an analogous base-catalyzed (poly)oxyalkylation reaction can be achieved using the same or a similar phenolic-aldehyde type resin, with an alkylene oxide, such as ethylene oxide, propylene oxide, butylene oxide, and mixtures thereof, as the source of oxyalkylene radicals.

B. Substrate Surfaces Normally Susceptible to Scaling

These may be any surfaces, metallic or non-metallic, upon which scale is prone to form, accumulate, and/or adhere during contact with hard waters. Among the metallic surfaces susceptible to scaling, the ferruginous surfaces are of especial interest because of their widely diversified use; however, the instant invention is equally applicable to other metallic substrate surfaces, as well as to non-metallic substrate surfaces such as organic hydrophobic polymeric substances, ceramics, glasses and similar siliceous materials.

C. Partially Cured Phenolic-Aldehyde Resins

In their broadest definition these substances, which according to the teachings of the instant invention are applied to scale-prone substrates in order ultimately to impart to the surfaces thereof improved scaling resistance, are synthetic resins formed through either the acid- or base-catalyzed condensation of an aldehyde with a phenolic material and which meet these criteria:

1. they are substantially free of cross-linking, as measured by the usual standards of fusibility and solubility in the usual solvents such as ketones, esters, aromatic hydrocarbons and the like, and,
2. that either subsequent to or both prior and subsequent to their application to the substrate surfaces said partially cured resins contain a plurality of oxyalkylene groups or, alternatively, contain a plurality of reactive hydroxyl groups capable of undergoing base-catalyzed reaction with a source of oxyalkylene radicals, and,
3. that subsequent to their application as coatings on the substrate surfaces, the resins must possess thermal stability to a degree such that the heat of modification and/or heat of curing of said resins will not appreciably affect the integrity of said coatings nor their final scaling resistance.

We have employed the terms "Resole" and "Novolak" in reference to certain types of partially cured, or so-called "first-stage", phenolic-aldehyde resin condensates preferred as intermediates in the practice of this invention. These designations, as used herein and generally by those skilled in the art, refer in particular to relatively low molecular weight (approximate range 250–1500), soluble, meltable, first-stage phenolic-aldehyde resins in which the aldehyde used for their preparation is formaldehyde, and the phenolic co-reactant is either phenol itself, alkyl phenols, or mixtures thereof. The term Resole is used specifically to designate such first-stage resins as are formed by the reaction of excess formaldehyde with the phenol (commonly at about 1.5:1 mole ratio) in the presence of a basic catalyst; such first-stage resins contain not only free phenolic hydroxy groups but also a plurality of hydroxymethyl ($-CH_2OH$) groups, and by virtue of the latter the Resoles may be fully cured by heat alone (accelerated, optionally, by a basic catalyst) to the final infusible, insoluble, cross-linked form. The term Novolak refers specifically to first-stage or intermediate, resins prepared through the reaction of less than an equivalent amount of formaldehyde with the phenol (typically at about 0.8:1 mole ratio) in the presence of an acidic catalyst; in contrast to the Resoles the Novolaks contain, essentially, hydroxy-groups of the phenolic type only, i.e., no appreciable quantity of hydroxymethyl groups are present therein, hence they are incapable of undergoing self-cure, as are the Resoles, through the agency of heat alone; as a consequence of the foregoing deficiency, when Novolaks are employed in the practice of this invention added aldehyde, preferably formaldehyde, or a source thereof, e.g., hexamethylene-tetramine, must be simultaneously present in order for final curing or cross-linking of the resin to take place.

Whereas we note the hereinabove defined Novolaks and Resoles, particularly the latter, as preferred intermediates, partially cured resins based on aldehydes other than formaldehyde and on phenols other than phenol itself, or on alkyl phenols, are also suitable for the practice of the instant invention so long as the said resins meet the three criteria we have specified hereinabove.

D. Surface Application of Partially Cured Phenolic Aldehyde Resins

Rotors 5.5 inches in length, 0.84 inch in diameter, and having a hemispherically rounded tip, are constructed from cold-rolled mild steel stock so that they can be heated by a quartz-encased coil heater which fits inside the rotor. After fabrication, the steel rotors are sand-blasted to roughen the external surface. The steel rotor is cleaned by the use of solvents, detergents and abrasive cleaners to produce a bare surface scrupulously free of oil, soil, or scale of any kind. The partially cured phenolic resin is then applied to the cleaned rotor by dipping, immersion, painting, spraying or the like so that the ultimate thickness of the first stage coating is between about 5 to 10 mils or more. While the coating might be applied in one thick application, it has been found that repeated thin applications of about 1 mil each provide a more uniform coating. Ordinarily, each 1-mil coating is followed by air drying, and a partial cure for 1 hour at 250°F. is carried out after the third and sixth mils.

If the applied resin has been rendered scaleresistant by polyoxyalkylation prior to its application on the rotor, curing and bonding of the coating on the rotor may be accomplished by heating at about 350°–400°F. in the presence of a source of formaldehyde and base. The aforementioned polyoxyalkylation may be carried out by using alkylene oxides such as ethylene oxide, propylene oxide, or mixtures thereof, or any of the other aforementioned sources of oxyalkylene groups, in the presence of basic catalysts until the desired average number of such groups are introduced into the resin.

If the phenolic resin coating has not been rendered scale-resistant prior to application, the preferred procedure below is employed.

F. Conversion or Modification of the Partially Cured Phenolic Resin to a Scale-Resistant Form The partially cured resin, following application to the rotor, is subjected to an intermediate cure at a temperature between about 340°F and 360°F, preferably at about 350°F, for about 15 minutes. The rotor is next washed thoroughly with water, dipped in an oxygenated solvent such as acetone, rinsed with water, and air dried. Polyoxyalkylation is then carried out by reacting the resin surface with a source of oxyalkylene radicals such as the lower alkylene oxides (ethylene and propylene oxides) or a reagent which releases oxyalkylene radicals, such as ethylene carbonate. In the former case the resin surface is contacted at the usual elevated temperatures as described in the literature, with a stoichiometric excess of alkylene oxide in the presence of a alkaline catalyst for a time sufficient to convert the available hydroxyl groups to (poly)oxyalkylene groups, thus rendering the surface scale-resistant.

In the preferred modification technique, after the final water rinse and air drying, the rotor coated with intermediately cured resin is contacted with a mixture of a basic catalytic material, such as alkali metal carbonate (about 1% by weight), and alkylene carbonate (about 99% by weight). The oxyalkylation is carried out at or near the boiling point of the alkylene carbonate. In the case of ethylene carbonate, the oxyalkylation is carried out between 350° and 380°F, preferably at 360°–375°F. Additional alkylene carbonate is added to the mixture as needed. After the reaction is completed, usually after about four hours have elapsed, the rotor is allowed to reach ambient temperature by slow air-cooling, then rinsed with water.

G. Laboratory Evaluation of the Ability of Modified and Unmodified Resin Surfaces to Resist Scale Deposition The test procedure used, identical to that described in the journal *Corrosion* Vol. 17, No. 5, pp. 232t–236t (May 1961), and U.S. Pat. No. 3,488,289, functions to cause a deposit of gypsum (scale) from a supersaturated solution thereof to slowly accrete on a heated rotor if the surface of that rotor is by nature scale prone. After the test, the rotor is carefully rinsed in acetone and allowed to dry under an infrared lamp. The adhering scale, if any, is carefully scraped from the rotor and weighed. The weight of scale on an uncoated, roughened stainless steel rotor used as a control may be compared to that deposited on a completely cured, conventional phenolic resin-coated rotor and to that deposited on a rotor whose coating has been modified by the cited technique. This testing method, though qualitative, has been found by experience to correlate well with field results over a period of years. In order to present the most detailed description of this invention, the following illustrative examples are submitted. All parts and percentages are by weight and all temperatures are given in °F.

EXAMPLE 1:

Preparation and Evaluation of Rotors Treated and Untreated with the Inventive Scale-Resistant Coating.

Rotor No. 1 was sprayed with two approximate 1-mil coats of a conventional phenolic preresin undercoat containing iron oxide as a pigment and binder, after which 2–3 additional layers of the same phenolic preresin containing no pigment was applied. The final thickness of the accumulated coatings was about 6 to 8 mils. A partial cure of the resin coatings was effected by heating the rotor at about 250°F for 1 hour in a hot air oven after the application of the pigmented undercoat; and again after application of the final unpigmented coat; final cure was then carried out by heating 60–90 minutes at 400°F.

Rotor No. 2 was sprayed with 4–5 coats of the same phenolic pre-resins, as described for rotor No. 1, partially cured at 350°F for 15 minutes, then immersed in molten ethylene carbonate, containing 1.5% by weight $K_2CO_3$ as reaction catalyst, for about 4 hours at from about 360°F to 370°F. Infrared spectra of the resin coated surface obtained by this treatment confirmed the presence of aliphatic poly-ether groups introduced by the oxyethylation reaction. The abilities of rotors No. 1 and No. 2 to withstand scale deposition were evaluated according to the procedure described in Section "F", supra. Rotor No. 2 showed no adherent scale whereas 0.86 g. scale deposited on rotor No. 1, demonstrating the scale inhibitory effect that the modification procedure produces.

Comparable results can be obtained insofar as inhibition of scale deposition is concerned if the resin is modified to a scale-resistant state before being cast on the rotors by treating it with excess ethylene oxide or with excess ethylene carbonate in the presence of a basic catalyst at elevated temperatures in order to introduce the required degree of oxyalkylation. In both instances in combination with a source of formaldehyde and base the thus reacted resin can be used to coat rotors, which, after being heated at about 350°–400°F to cure and bond the modified resin to the substrate rotor surfaces, are resistant to scale deposition.

As indicated above, iron oxide is used to increase the tenacity with which the initial coats of partially cured resin adhere to the substrate. Other binders can be used as well.

The scale inhibiting properties imparted to the resin coating cited in Example 1 are only illustrative of the inventive concept. Comparable results can be obtained using other articles of manufacture including conduits, storage vessels, heat exchangers, etc.

EXAMPLE 2

Further Preparation of Modified Phenolic Surfaces and Comparisons with Various Controls.

A. The procedures of "F" and Example 1 were followed using four rotors designated numbers 3, 4, 5 and 6. Rotor No. 3 was a roughened, uncoated, untreated, cleaned stainless-steel control rotor (bare mild steel not only scales, but corrodes severely under the test conditions). Rotor No. 4 and had 4-5 partially cured coats as did No. 1 in the preceding example. Rotor No. 5 was modified as was rotor No. 2 in Example 1 by exposure of the partially cured pre-resin to the molten ethylene carbonate-potassium carbonate mixture under the same oxyalkylation reaction conditions. Rotor No. 6 was treated as rotor No. 5, except that the partially cured pre-resin was exposed to an ethylene carbonate-potassium hydroxide mixture; the catalyst KOH was substituted for $K_2CO_3$ on a weight-for-weight basis.

Laboratory evaluation of the ability of the cited rotors to withstand scale deposition was carried out using the procedure described on "F". As expected, the uncoated rotor No. 3 was completely covered with adherent scale. Rotor No. 4, while coated with partially cured phenolic resin but unmodified by the method of this invention, evidenced scale deposition. Modified rotors No. 5 and No. 6 showed no scale deposition.

B. The rotors from "A" preceding, were washed in water for about an hour, in acetone for 15-20 minutes, then allowed to dry in air. The rotor surfaces were tested for scale inhibiting properties using the procedure of "F", except that the water used to prepare the solutions to which the rotors were exposed had been aerated. Aeration was carried out because the presence of gas bubbles in a mineralized water environment is said to be accompanied by scaling. Rotors No. 5 and No. 6 showed no scale deposition. Partially cured but unmodified coated rotor No. 4 showed slight scaling, while the uncoated control No. 3 showed moderate scaling.

EXAMPLES 3-7

The Effect of Preceding the Ethylene Carbonate-Base Catalyzed Oxyethylation with Full Curing of the Resin.

Each of four rotors, designated numbers 7, 8, 9 and 10, cleaned as in Example 1, were coated with 6 mils of a Resole pre-resin by 4 coating applications as described in Examples 1 and 2, each rotor was then fully cured by heating to 400°F for 60-90 minutes. Rotor No. 7 was not reacted with 99% ethylene carbonate-1.5% $K_2CO_3$. Rotor No. 8 was reacted with the ethylene carbonate-potassium carbonate mixture for 4 hours at 370°F, No. 9 for 8.3 hours, and No. 10 for 14 hours. Rotor No. 11 was a stainless-steel uncoated control.

Approximately the same weight of scale was deposited on the coated and fully cured, but unmodified, rotor No. 7 as was deposited on the uncoated stainless-steel rotor No. 11; however, the presence of some scale on rotors No. 8, No. 9 and No. 10 is a qualitative indication that scale deposition will occur if the resin is fully cured before exposure to the oxyalkylation conditions, and hence is not a preferred modification technique of this invention. The scaling test results are listed in Table I.

Table I

| | Weight of Scale on Rotor vs. Reaction Time of Completely Cured Phenolic Resin with Ethylene Carbonate-Potassium Carbonate | | |
|---|---|---|---|
| Example No. | Rotor No. | Wt. Scale(g) | Treatment Time(hr., 370°F) |
| 3 | 7 | 1.01 | none |
| 4 | 8 | 0.03 | 4 |
| 5 | 9 | 0.17 | 8.3 |
| 6 | 10 | 0.03 | 14 |
| 7 | 11 | 1.01 | Stainless-steel control |

EXAMPLES 8-10

The Effect of Conditions of Final Cure on Rotors Coated with Unmodified Pre-resin.

Using the procedure described in Examples 1 and 2, three mild steel rotors were coated with a Resole pre-resin chemically identical to that used in earlier examples. Each of the three rotors (No. 12, No. 13 and No. 14) had a partially cured resin coating about 6 mils thick but none had been treated with ethylene carbonate and basic catalyst to produce scale-resistant surfaces. The last two of the rotors (No. 13 and No. 14) were cured at 400°F for 30 and 90 minutes respectively, while the first rotor (No. 12) was left partially cured. The purpose of the experiment is to show the contribution of the reactive hydroxyl groups present in the surface of the partially cured Resole in preventing scale deposition. The partially cured coating allows little scale to deposit. By contrast, a 30 minute final cure at 400°F allows a ten-fold increase in scale buildup, presumably because of the disappearance of free hydroxyl ($CH_2OH$) groups. Increasing the cure time to 90 minutes at 400°F (which conditions are preferred for adequate bonding of the phenolic coating to the metallic substrate) further decreases the availability of free surface hydroxyl groups. This decrease results in a substantial increase in the amount of deposited scale, as shown in Table II.

Table II

| | Weight of Scale on Rotor vs. Condition of Final Cure | | |
|---|---|---|---|
| Example No. | Rotor | Weight Scale (g.) | Treatment Time (min. 400°F) |
| 8 | 12 | 0.01 | none |
| 9 | 13 | 0.12 | 30 |
| 10 | 14 | 0.23 | 90 |

EXAMPLES 11-16

Determination of Minimum Amount of Final Cure at 400°F Required to Preserve Coating Integrity and Scale-Inhibition Properties.

Six roughened, cleaned mild-steel rotors designated No. 15-20 were coated with 6 mils of phenolic pre-resin and partially cured. All rotors were subjected to a final cure at temperatures ranging from 350°-400°F.

with the exception of No. 15. The six rotor coatings were then modified by 4 hour reactions at 370°F with the reaction mixture of ethylene carbonate-potassium carbonate. The data in Table III shown below establishes that when no high temperature cure is used the integrity of the coating is compromised when it is subjected to the conditions of oxyalkylation. However, the integrity of the coating is preserved by curing for as little as 15 minutes at 350°F. These conditions result in preserving both the physical integrity of the coating and its scale inhibition properties. Longer curing times at 350°F to 400°F also are satisfactory and, in fact, are preferred for long-term durability of the coatings under severe in-service conditions.

Table III

| | Weight of Scale vs. Final Cure Conditions on Chemically Modified Surfaces | | |
|---|---|---|---|
| Example No. | Rotor No. | Weight Scale(g.) | Final Cure Conditions |
| 11 | 15 | Coating peeled upon cooling after modifying reaction | None |
| 12 | 16 | 0.0 | 15 min; 400°F |
| 13 | 17 | 0.0 | 30 min; 400°F |
| 14 | 18 | 0.0 | 90 min; 400°F |
| 15 | 19 | 0.0 | 15 min; 350°F |
| 16 | 20 | 0.0 | 30 min; 350°F |

As indicated throughout this disclosure, the novel process of this invention is advantageous in several respects. For example, the phenolic-aldehyde pre-resins are relatively inexpensive, readily available coating materials which can be applied to surfaces to be protected from scaling by standard techniques well known in the art using only moderate conditions to effect initial bonding. Further, in the preferred manner of producing modified phenolic-aldehyde coatings having scale-resistant characteristics, the conditions of oxyalkylation are relatively mild and the resulting modified surfaces inhibit scale formation, whereas uncoated metal as well as other common type surfaces and unmodified phenolic resinous surfaces, are highly susceptible to scale adherent formation.

In addition, the long-term conversion of scale-susceptible to scale-resistant surfaces represents a significant advance over the prior art, and the degree of scale inhibition obtained by the instant process is quite unexpected.

The process of the subject invention is flexible in a substantial number of respects, and numerous changes, substitutions and modifications can be made in the process without departing from the inventive concept. The metes and bounds of this invention are best delineated by the claims which follow read in conjunction with this specification.

What is claimed is:

1. A process for producing a fully cured, infusible coating which when applied to surfaces normally susceptible to the deposition of mineral scale substantially improves the resistance of said susceptible surfaces to said scale, said process comprising the steps of:

a. applying to the substrate whose resistance to scaling is to be improved, an acid or base catalyzed phenolic-aldehyde resin condensate containing a substantial number of reactive hydroxyl groups, said groups being susceptible to oxyalkylation by a base catalyzed reaction with alkylene carbonate; and b. contacting said resin condensate coated on said substrate with a composition comprising at least a catalytic quantity of basic catalyst and at least two moles of molten alkylene carbonate per mole of phenolic hydroxyl groups at a temperature ranging from about 350° to 380°F., until the surface of said coated substrate which is normally susceptible to scaling is converted into a surface having substantially improved scale-resistant properties; then, c. curing said resin having scale-resistant properties, until it becomes a fully cured, infusible coating bonded to the normally scale-susceptible surface.

2. The process of claim 1 wherein the phenolic reactant of the resin is phenol.

3. The process of claim 1 wherein the phenolic reactant of the resin is a mixture of phenol and alkyl phenol.

4. The process of claim 1 wherein the aldehyde reactant of the resin is formaldehyde.

5. The process of claim 1 wherein the phenolic resin is of the resole type formed by reacting a stoichiometric excess of aldehyde reactant over that of the phenolic reactant and the reaction is carried out in the presence of basic catalyst.

6. The process of claim 1 wherein the phenolic resin is of the novalak type formed by reacting a stoichiometric excess of phenolic reactant over that of the aldehyde reactant in the presence of acidic catalyst.

7. The process of claim 1 wherein the phenolic-aldehyde resin contains as optional additives pigments, fillers, and reinforcing agents.

8. The process of claim 1 wherein the alkylene carbonate is ethylene carbonate.

9. The process of claim 1 wherein the alkylene carbonate is propylene carbonate.

10. The process of claim 1 wherein the surface to be protected is a ceramic material.

11. The process of claim 1 wherein the surface to be protected is a hydrophobic polymer.

* * * * *